June 11, 1940.	K. K. COOPER	2,204,402
DYNAMO-ELECTRIC MACHINE
Filed Jan. 20, 1938
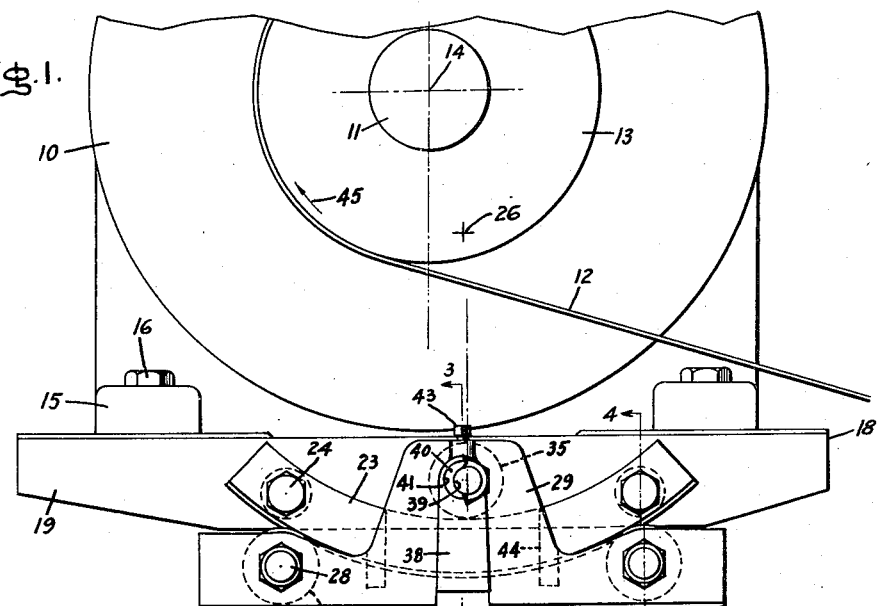
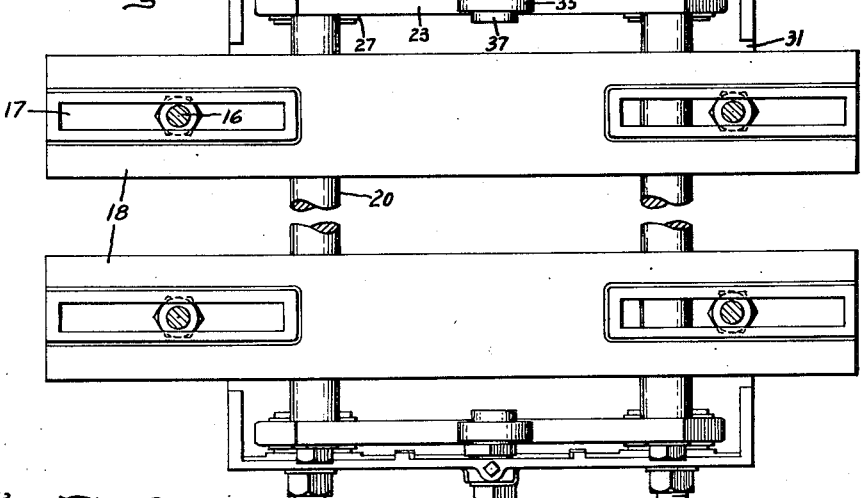
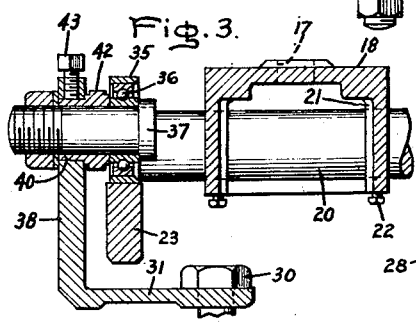
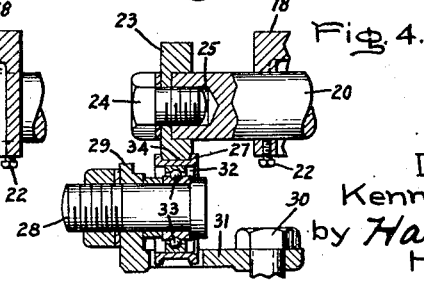
Inventor:
Kenneth K. Cooper,
by Harry E. Dunham
His Attorney.

Patented June 11, 1940

2,204,402

UNITED STATES PATENT OFFICE 2,204,402

DYNAMO-ELECTRIC MACHINE

Kenneth K. Cooper, Fort Wayne, Ind., assignor to General Electric Company, a corporation of New York Application January 20, 1938, Serial No. 185,884

8 Claims. (Cl. 248—23)

My invention relates to dynamo-electric machines, and more particularly to mountings for such machines.

An object of my invention is to provide a dynamo-electric machine or the like with a frictional driving connection having an improved arrangement for regulating the friction in the driving connection.

Further objects and advantages of my invention will become apparent and my invention will be better understood from the following description referring to the accompanying drawing, and the features of novelty which characterize my invention will be pointed out with particularity in the claims annexed to and forming part of this specification.

For a better understanding of my invention, reference is made to the accompanying drawing wherein Fig. 1 is an end elevation, partly broken away, of a dynamo-electric machine provided with a mounting embodying my invention; Fig. 2 is a plan view of the mounting base of the machine shown in Fig. 1; Fig. 3 is a sectional view taken along line 3—3 of Fig. 1; and Fig. 4 is a sectional view taken along line 4—4 of Fig. 1.

Referring to the drawing, I have shown a dynamo-electric machine having a stationary member 10 and a rotatable member mounted on a shaft 11. Power is transmitted from the dynamo-electric machine to a driven machine through a flexible frictional driving connection comprising a driving belt 12 which engages a pulley 13 mounted on the shaft 11.

During normal operation of the dynamo-electric machine, it is desirable that this supporting arrangement should utilize a displacing force exerted by the belt 12 to vary the tension in the belt in accordance with the load transmitted.

In order to provide the desired starting and running friction in the driving connection, the stationary member 10 of the dynamo-electric machine is supported so as to move pivotally about an axis within the belt loop between the tight side of the belt and the axis 14 of the shaft, and also on the side of a vertical plane through the axis 14 of the shaft toward the open side of the belt loop on the pulley 13. This pivotal axis is eccentric to the axis 14 of the rotatable member of the machine. The stationary member of the dynamo-electric machine is provided with a set of supporting feet 15 adjustably secured to the mounting base by bolts 16 extending through openings in the feet 15 and through transversely extending slots 17 formed adjacent the ends of a pair of transversely extending mounting rails 18. These mounting rails are provided with downwardly extending flanges 19 at each side thereof, and are rigidly connected together by a pair of supporting elements or rods 20 extending through openings formed in bosses 21 on the flanges 19. Set screws 22 threadedly engage openings in the lower sides of the bosses 21 and engage the under surface of the supporting rods 20, so as to secure the rails in position relative to the rods 20.

In order to support the dynamo-electric machine for pivotal movement about the eccentric axis, curved or arcuate tracks 23 are arranged at each end of the rods 20, and secured to adjacent ends of the pair of rods 20 by screws 24 threadedly engaged in openings 25 formed in the ends of these rods. The curvature of this pair of arcuate tracks 23 is formed on a center of curvature 26 on the eccentric pivotal axis of the dynamo-electric machine within the radius of the frictional driving connection of the belt and pulley. In order to provide for the pivoting of the stationary member of the machine about this axis through the center of curvature 26 of the curved tracks 23, I provide a pair of rollers 27 rotatably secured by bolts 28 to an upwardly extending flange 29 formed on a supporting member arranged on each side of the mounting base. These supporting members are arranged to be secured in position by screws or bolts 30 extending through openings in inwardly extending flanges 31 formed on the supporting members. The rollers 27 are formed with a central opening 32 and are supported by ball bearings 33 on the bolts 28 and are formed with a groove 34 on the outer peripheral surface thereof which engages the lower edge of the curved tracks 23 to assist in guiding and retaining these tracks in assembled relation on the mounting base. To prevent axial tilting of the machine on the mounting base, and to provide for slight adjustment thereof, a third roller 35 is arranged to engage rotatably the upper surface of each curved track 23. These rollers are rotatably supported by ball bearings 36 on bolts 37 secured in bosses 38 formed on the upwardly extending supporting members 29. Slight adjustment of the position of these third rollers 35 is provided by mounting each supporting bolt 37 in a central opening 39 formed in an eccentric cam or bushing 40. The outer peripheral surface 41 of the bushing is concentric with the opening in the upwardly extending supporting member boss 38, and the opening through the bushing 40 for the bolt 37 is formed eccentric with respect to the outer peripheral surface of the bushing. A hexagonal outer surface 42 is provided on the bushing cam between the upwardly extending supporting member boss 38 and the roller 35 to facilitate turning of the bushing and to provide for adjusting the position of the supporting bolt 37 and roller 35 with respect to the curved track 23 and the supporting member 29. A set screw 43 threadedly engages an opening in the top of the boss 38 and engages the upper peripheral surface of the bushing cam 40 to retain it in any desired position. In this manner, the dynamo-electric machine is rotatably supported by curved tracks 23 on the rollers 27 and can pivot in freely tiltable relation about an axis 26 eccentric with respect to the rotational axis 14 of the rotatable member of the machine. A pair of stops or lugs 44 are formed on the inner surface of each of the upwardly extending supporting member flanges 29 to limit the rotational movement of the curved tracks 23, so that when the dynamo-electric machine has pivoted about the axis 26 so that the head of either of the screws 24 engages one of the stops 44, the curved track 23 will be prevented from rotating any further and dropping off one of the rollers 27.

With such a pivotal mounting of the dynamo-electric machine, it is necessary to maintain the driving pulley in contact with the driving belt when the machine is at rest, so that there will be sufficient friction between the pulley and the belt to start the load. This initial biasing force is provided by supporting the dynamo-electric machine on the mounting rails 18 so that the rotational axis 14 of the rotatable member of the dynamo-electric machine and a greater proportion of the weight of the machine is nearer the side of the belt loop in engagement with the pulley than on the disengaged side of the pulley. In this manner, the weight of the machine tends to pivot it into the loop of the belt about the pivotal axis 26 and provides the initial tension thereon. The starting friction of the belt may be adjusted by varying the relative position of the dynamo-electric machine supporting feet 15 on the mounting rails 18, thereby varying the eccentricity of the pivotal axis 26 with respect to the center of gravity of the machine.

During operation, the driving friction is increased by tightening of the belt 12 when the rotatable member of the motor rotates in a clockwise direction, as viewed in Fig. 1 and indicated by the arrow 45. Under these conditions, the lower side of the belt 12, will be the tight side, and the upper side will be the loose side of the belt. In order to obtain a tightening of the belt, it is, therefore, necessary that the torque about the pivotal axis 26 resulting from the displacing force exerted on the machine by the tight side of the belt be greater than the torque about this axis resulting from the displacing force exerted on the machine by the loose side of the belt. A consideration of these displacing forces in relation to the pivotal axis indicates that the location of the pivotal axis should be at a lesser distance from the rotational axis of the rotatable member than the radius of the pulley and eccentric with respect to this rotational axis on the driving side of the frictional connection, which, in the illustrated embodiment of my invention, is the tight side of the belt. This eccentric arrangement of the pivotal support for the dynamo-electric machine and the particular relation of the pivot to the sides of the belt is not my invention, but is the invention of Wilbur W.

Warner, and is described and claimed in his U. S. Patent 2,074,135, March 16, 1937, and assigned to the General Electric Company, assignee of this application.

While I have illustrated and described a particular embodiment of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine or the like including a stationary member and a rotatable member, a supporting member provided with curved tracks, a second supporting member, and means secured to one of said supporting members arranged to engage said curved track for pivotally supporting said dynamo-electric machine in freely tiltable relation about an axis eccentric with respect to the rotational axis of said rotatable member.

2. A dynamo-electric machine or the like including a stationary member and a rotatable member, a supporting member provided with curved tracks, a second supporting member, and means including rollers rotatably secured to one of said supporting members and engaging said curved tracks for pivotally supporting said stationary member in freely tiltable relation about an axis eccentric with respect to the rotational axis of said rotatable member.

3. A dynamo-electric machine or the like including a stationary member and a rotatable member, a mounting base for said stationary member, a support, rollers rotatably secured to said support, and means including a curved track secured to said mounting base and carried by said rollers for supporting said stationary member movably in freely tiltable relation about an axis eccentric with respect to the rotational axis of said rotatable member.

4. A dynamo-electric machine or the like including a stationary member and a rotatable member provided with a frictional driving connection adapted to exert a displacing force on said machine, a supporting member provided with curved tracks, a second supporting member, and means including rollers rotatably secured to one of said supporting members and engaging said curved tracks for supporting said stationary member in freely tiltable relation about an axis eccentric with respect to the rotational axis of said rotatable member and for utilizing said displacing force exerted on said machine by said driving connection to vary the driving friction in said driving connection.

5. A dynamo-electric machine or the like including a stationary member and a rotatable member provided with a frictional driving connection adapted to exert a displacing force on said machine, a supporting member provided with arcuate tracks having a center of curvature arranged on an axis within the radius of said frictional driving connection and eccentric with respect to the rotational axis of said rotatable member, a second supporting member, and means including rollers rotatably secured to one of said supporting members for rotatably supporting each of tracks for supporting said stationary member pivotally in freely tiltable relation about said eccentric axis and for utilizing said displacing force exerted on said machine by said driving connection to vary the driving friction in said driving connection.

6. A dynamo-electric machine or the like including a stationary member and a rotatable member, a plurality of curved tracks secured to said stationary member, a pair of supporting members, means including a pair of rollers rotatably secured to each of said supporting members and engaging said curved tracks for supporting said stationary member pivotally in freely tiltable relation about an axis eccentric with respect to the rotational axis of said rotatable member, and means including a third roller engaging the upper surface of each of said curved tracks for retaining said curved tracks in place.

7. A dynamo-electric machine or the like including a stationary member and a rotatable member, a plurality of curved tracks secured to said stationary member, a pair of supporting members, means including a pair of rollers rotatably secured to each of said supporting members and engaging said curved tracks for supporting said stationary member pivotally about an axis eccentric with respect to the rotational axis of said rotatable member, means including a third roller engaging the upper surface of each of said curved tracks for retaining said curved tracks in place, and means including an eccentric cam adjustably secured to each of said supporting members for rotatably supporting each of said third rollers.

8. A dynamo-electric machine or the like including a stationary member and a rotatable member provided with a frictional driving connection adapted to exert a displacing force on said machine, a pair of mounting rails secured to said stationary member, a pair of transversely extending supporting rods secured to said mounting rails in spaced-apart relation, a pair of curved tracks, means for securing one of said curved tracks to adjacent ends of said supporting rods at each end thereof, a pair of supporting members, means including a pair of rollers rotatably secured to each of said supporting members and engaging said curved tracks for supporting said stationary member pivotally about an axis eccentric with respect to the rotational axis of said rotatable member and for utilizing said displacing force exerted on said machine by said driving connection to vary the driving friction in said driving connection, means including a third roller engaging the upper surface of each of said curved tracks for retaining said curved tracks in place, means including an eccentric cam adjustably secured to each of said supporting members for rotatably supporting each of said third rollers, and means including stops formed on said supporting members for limiting the displacement of said curved tracks with respect to said supporting rollers.

KENNETH K. COOPER.

CERTIFICATE OF CORRECTION.

Patent No. 2,204,402.                         June 11, 1940.

KENNETH K. COOPER.

It is hereby certified that error appears in the printed specification of the above numbered patent requiring correction as follows: Page 2, second column, line 43, claim 3, for "titlable" read --tiltable--; line 72, claim 5, strike out "porting members for rotatably supporting each of" and insert instead --supporting members and engaging said arcuate--; and that the said Letters Patent should be read with this correction therein that the same may conform to the record of the case in the Patent Office.

Signed and sealed this 30th day of July, A. D. 1940.

(Seal)                                               Henry Van Arsdale,
                                                      Acting Commissioner of Patents.